Aug. 30, 1966  F. P. CROUCH ETAL  3,269,235
ROTARY CUTTING APPARATUS
Original Filed May 27, 1963  7 Sheets-Sheet 3
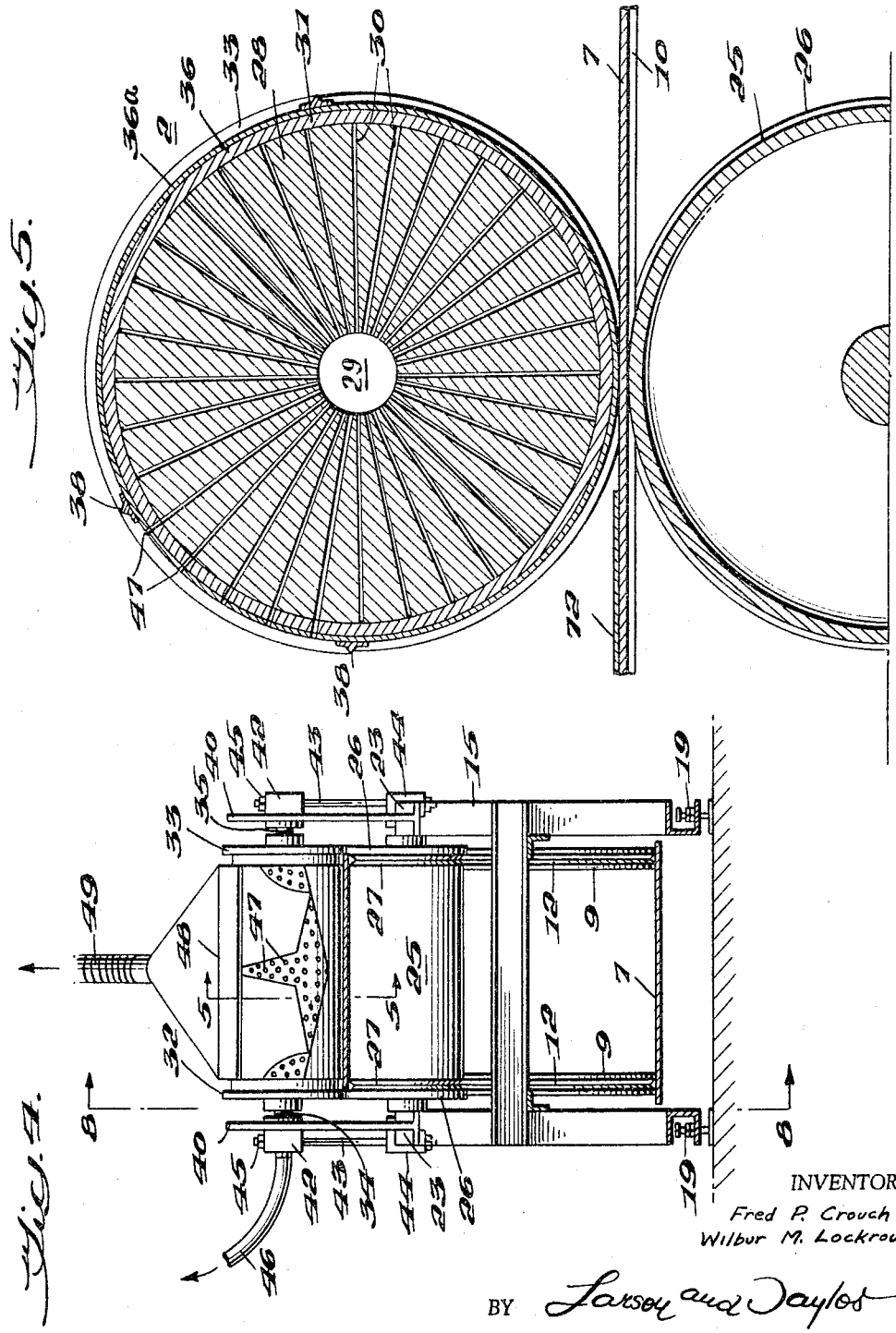
INVENTORS
Fred P. Crouch
Wilbur M. Lockrow
BY Larson and Taylor
ATTORNEYS

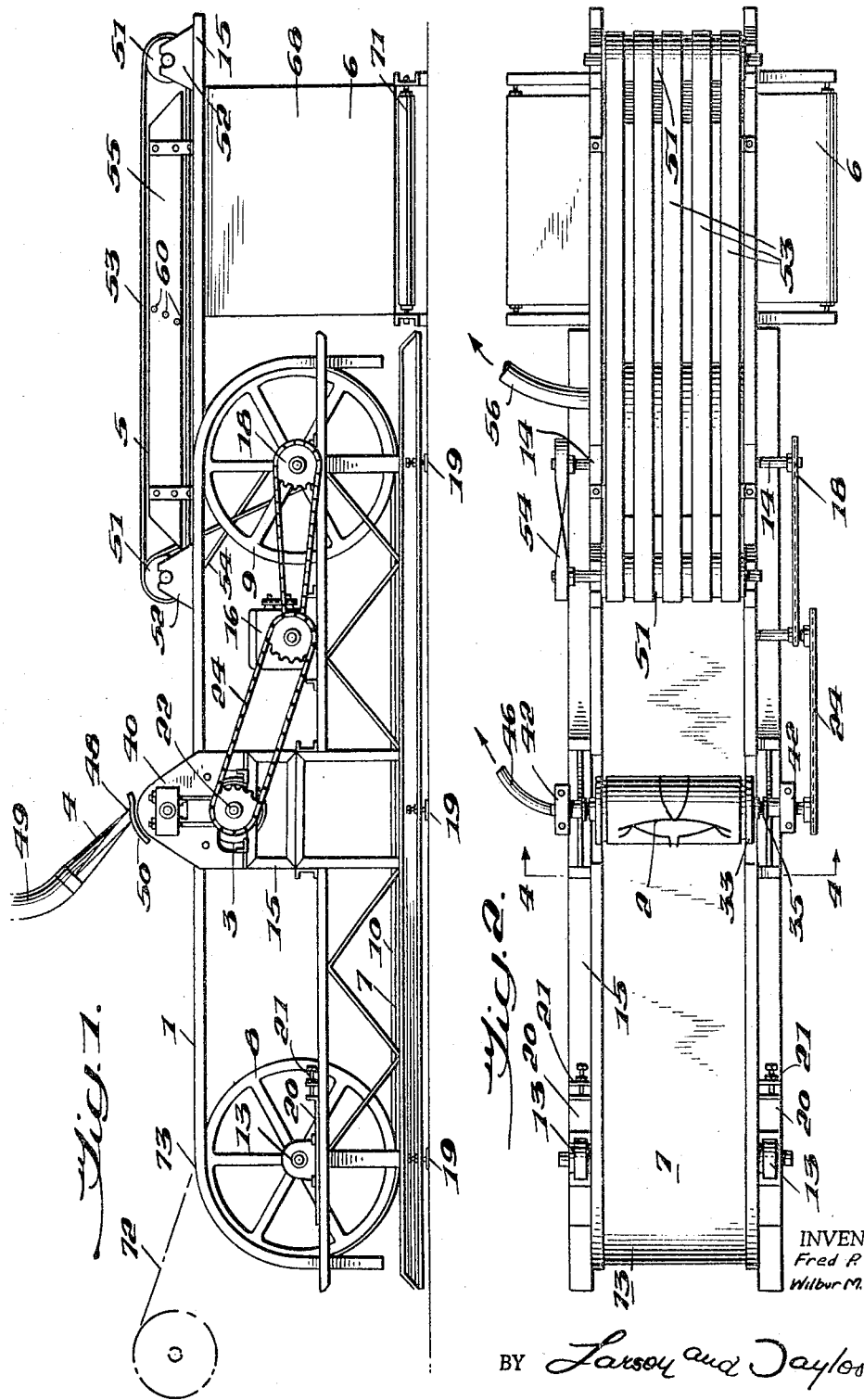

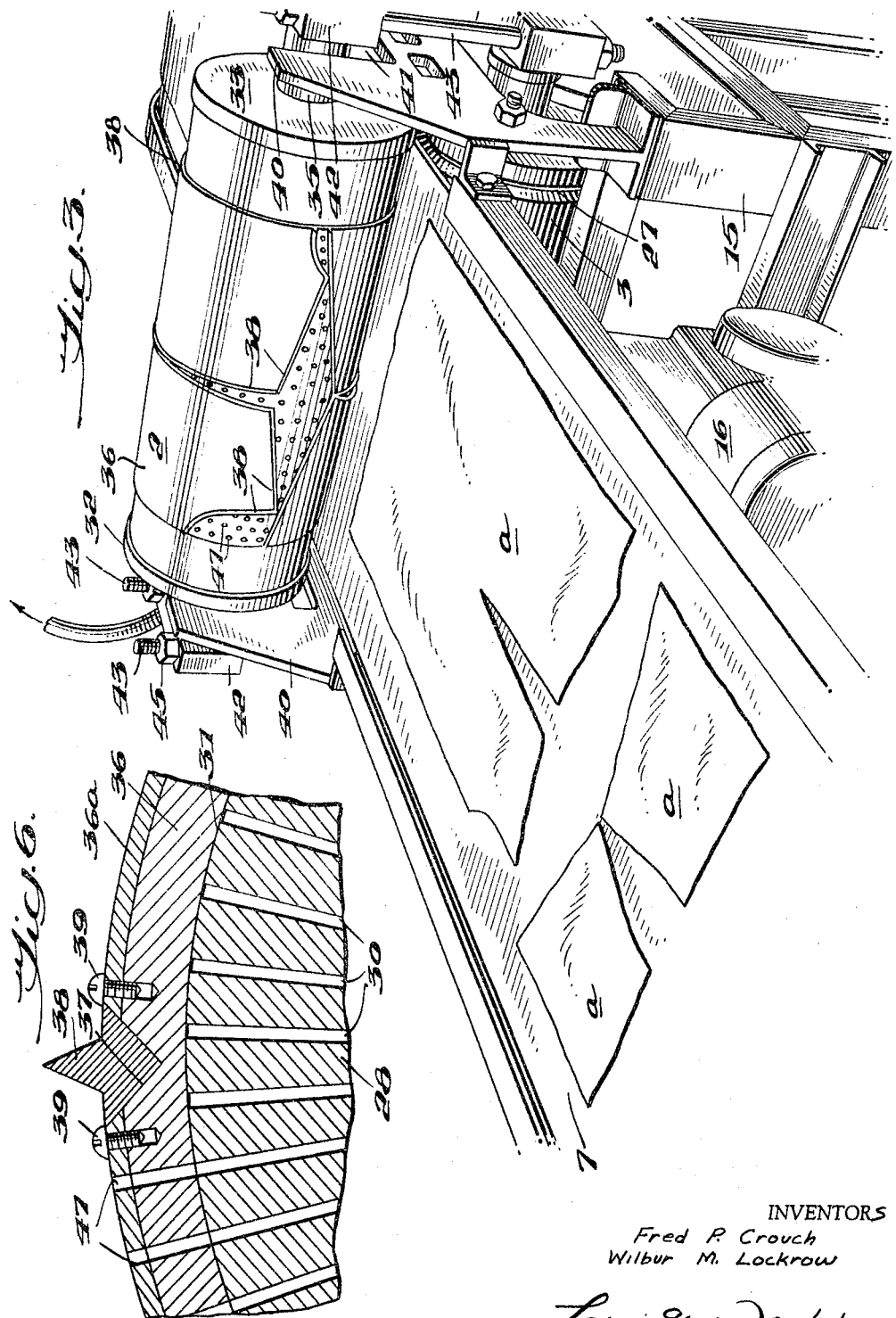

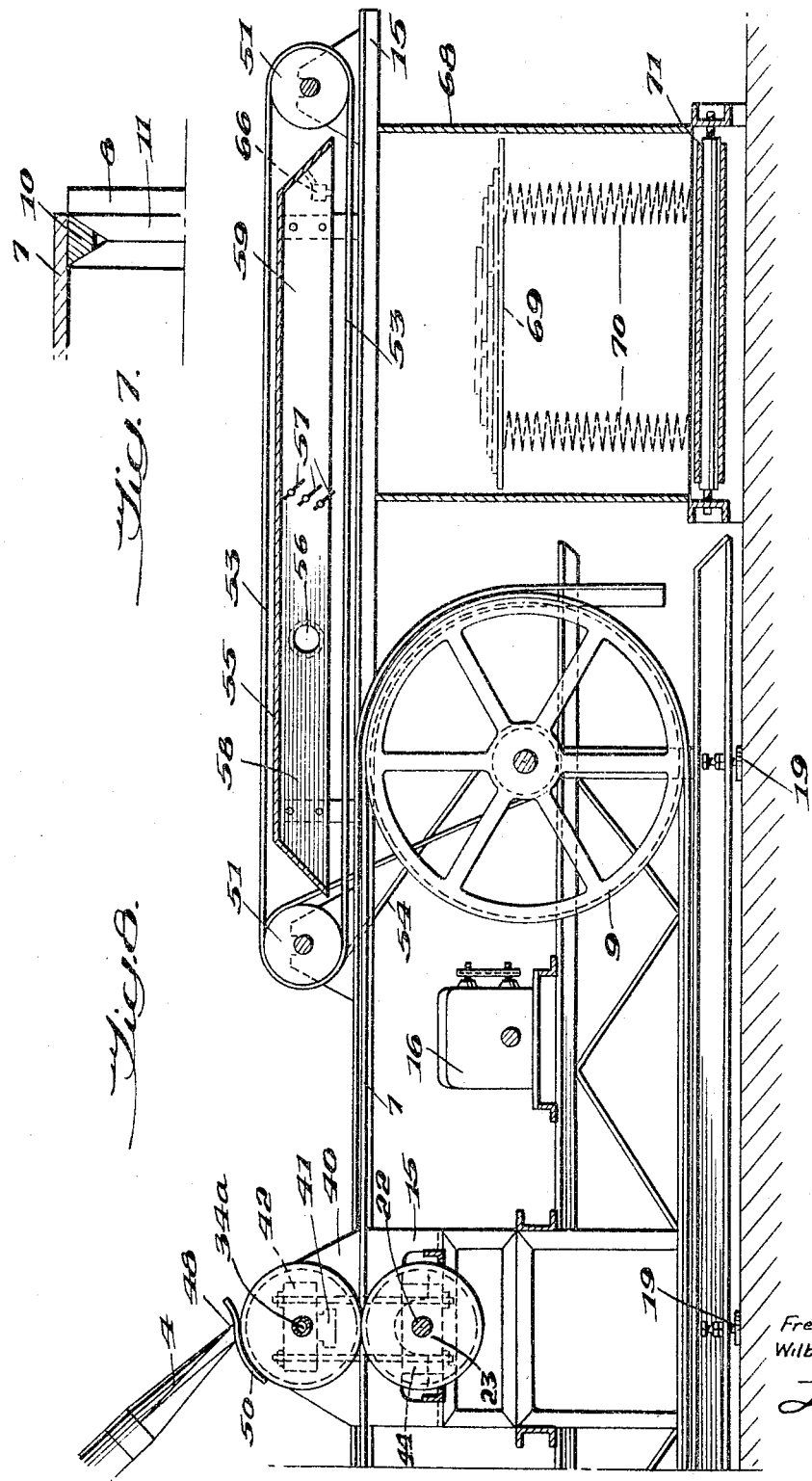

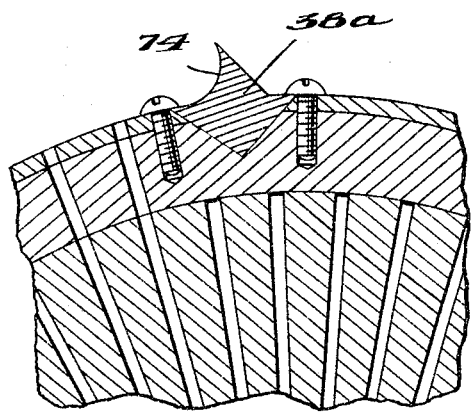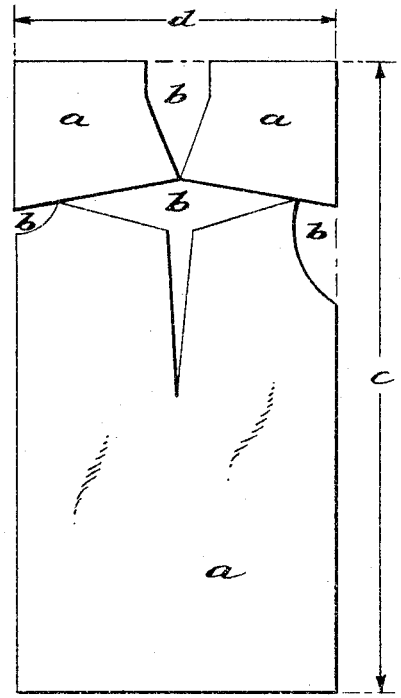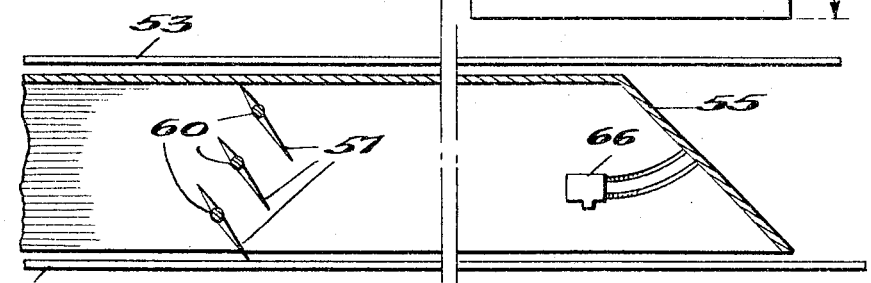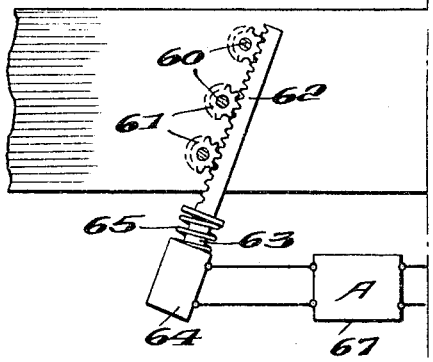

Aug. 30, 1966 F. P. CROUCH ETAL 3,269,235
ROTARY CUTTING APPARATUS
Original Filed May 27, 1963 7 Sheets-Sheet 6
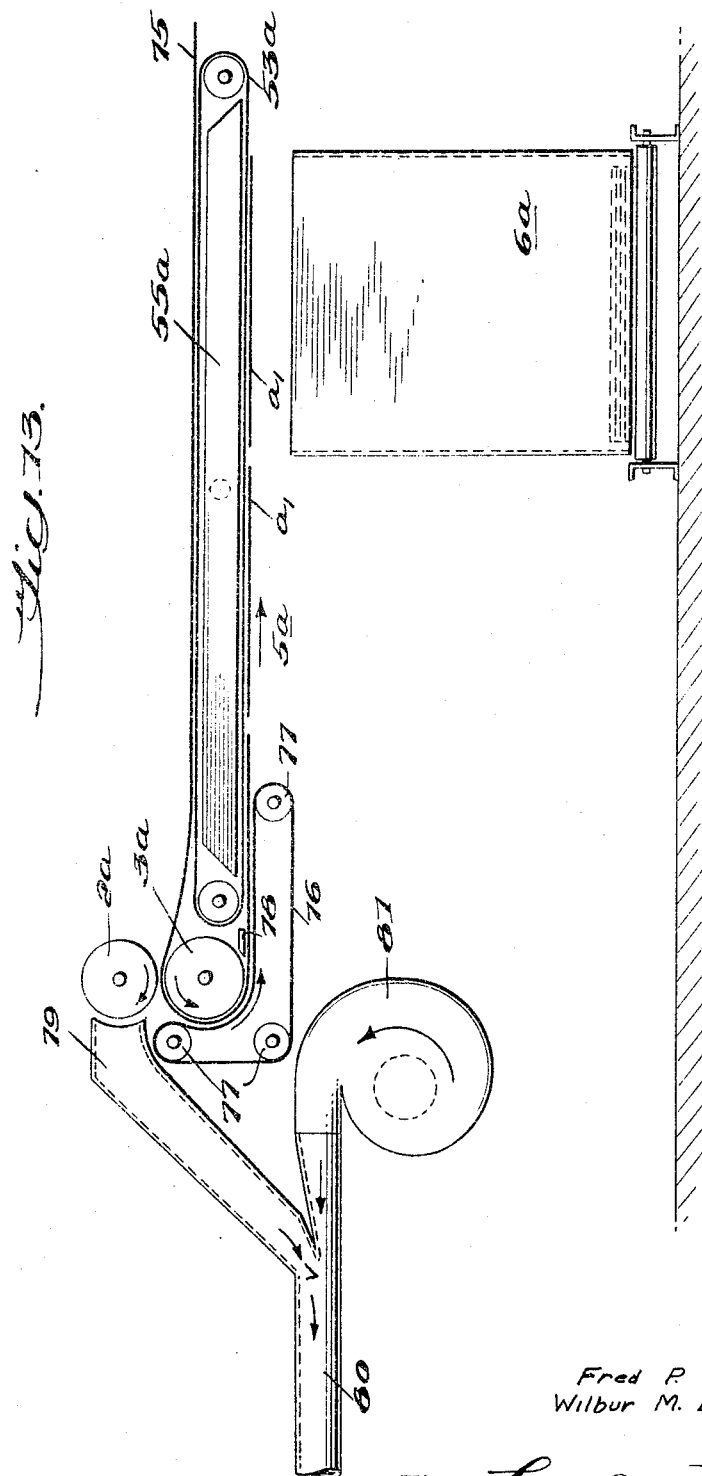
INVENTORS
Fred P. Crouch
Wilbur M. Lockrow
BY Larson and Taylor
ATTORNEYS

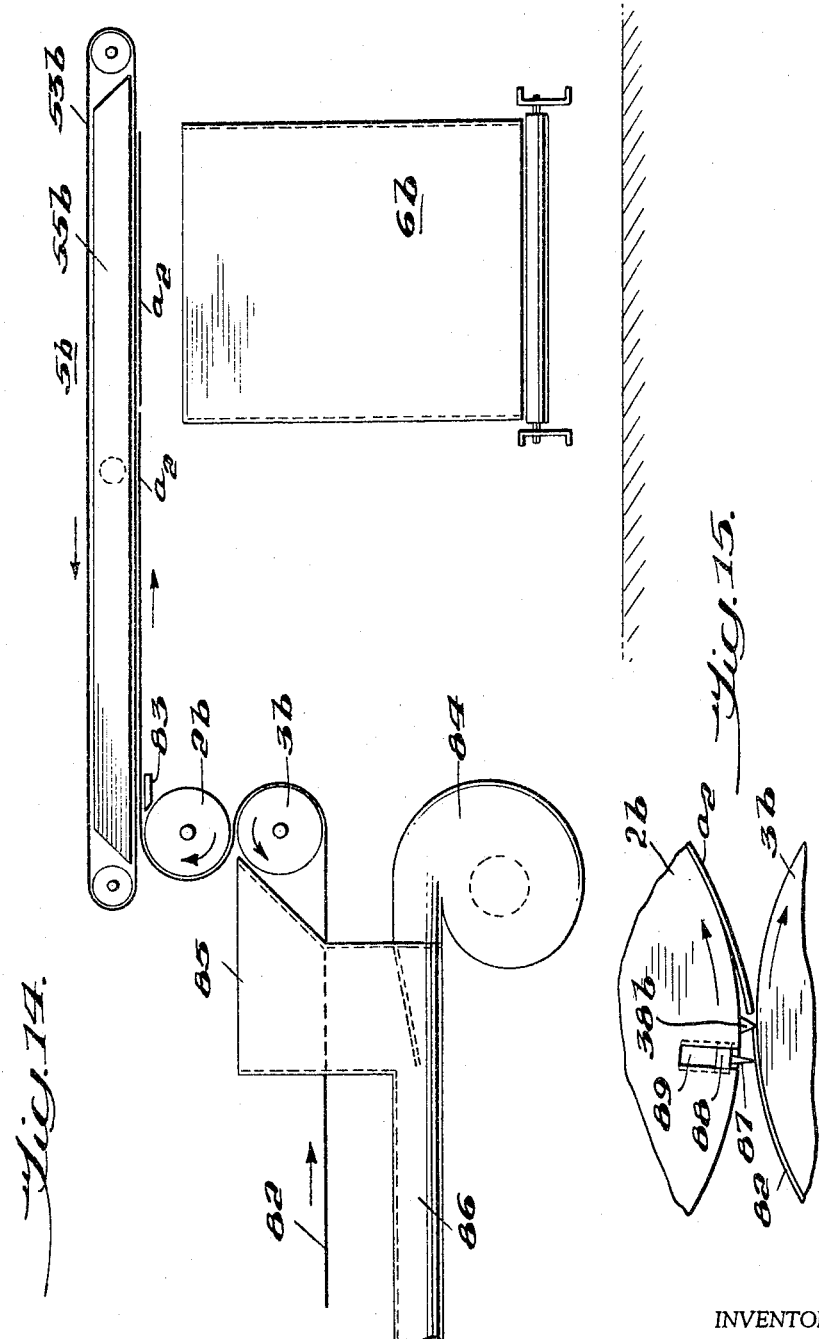

United States Patent Office 3,269,235
Patented August 30, 1966

3,269,235
ROTARY CUTTING APPARATUS
Fred P. Crouch and Wilbur M. Lockrow, Winston-Salem, N.C., assignors, by mesne assignments, to Hanes Corporation, Winston-Salem, N.C., a corporation of North Carolina
Original application May 27, 1963, Ser. No. 283,252. Divided and this application Feb. 18, 1965, Ser. No. 449,348
4 Claims. (Cl. 83—99)

This is a division of application Ser. No. 283,252, filed May 27, 1963, now Patent No. 3,192,809 of July 6, 1965.

The present invention relates to apparatus for use in the cutting of cloth into blanks for subsequent sewing into garments. More particularly the invention relates to a rotary die cutter for a continuous cloth cutter of the type disclosed and claimed in said Patent No. 3,192,809.

As is well known, cloth cutting has been extensively done by placing one or more layers of finished cloth in web form on a table, marking cutting lines on the uppermost layer through the use of patterns or charts, and then cutting vertically through all of the layers of cloth as marked with manually or electrically driven knives or scissors. Occasionally, preformed stamping guides were used in specially developed reciprocating presses.

The well known layer method is of course useful, but it does have several disadvantages. These include, for example, the extensive time required to "set up" and the inevitable size variation from layer to layer within one cutting, particularly in the stacks having a large number of layers. Moreover, because of normal color variations in dyeing, matching from the stacks of cut blanks used for the individual garments required time. On the other hand, the reciprocating presses could only be used for limited and special jobs where production and waste were unimportant factors.

Our invention as disclosed and claimed herein and in our above mentioned patent overcomes many of these difficulties, in that it reduces the number of man-hours required for "set-up" and operation. For use particularly with repeating patterns, such as T shirts and pull-over shirts, groups of blanks for individual garments are cut and stacked together, thereby eliminating color variations and providing a rapid collection for subsequent sewing. Where earlier operations required at least one and preferably two or three operators for each cutting and stacking operation, our invention need require only one operator for several operations.

An object of the invention of this application resides in the provision of a cutting roller which can cut all of the blanks necessary for the subsequent formation of a garment, and which roller may be adaptable for various patterns and operating sequences.

A further object of the invention resides in the provision of such a cutting roller wherein the cutting blades are easily removable and replaceable.

A further object resides in the provision of such a cutting roller wherein the cut blanks and waste portions are retained on or discarded from the roller as desired so as to facilitate distribution and further handling of the cut parts by other apparatus with which the cutting roller is used.

Yet other objects and advantages of our invention will become apparent during the description of the preferred embodiments as described and shown in the attached drawings, in which like numerals represent like parts throughout, and in which, FIG. 1 is a side view of a preferred embodiment of apparatus in which the instant invention is adapted to be used;

FIG. 2 is a top view with the scrap removal system removed for clarity;

FIG. 3 is a partial perspective view of the cutting apparatus in accordance with the instant invention;

FIG. 4 is a sectional view taken on line 4—4 of FIG. 2;

FIG. 5 is a sectional view of a cutter roller according to the invention, taken on line 5—5 of FIG. 4;

FIG. 6 is a partial sectional view showing a cutter blade assembly according to the invention;

FIG. 7 is a detail view showing the belt alignment means;

FIG. 8 is a sectional view taken on line 8—8 of FIG. 4;

FIG. 9 is a sectional detail showing the detector and vacuum breaker valve apparatus;

FIG. 10 is a detail of the valve control mechanism;

FIG. 11 shows an alternate arrangement for a cutter blade assembly according to the invention;

FIG. 12 is a pattern layout of a typical T-shirt suitable for use with this invention;

FIG. 13 is a schematic view of a second embodiment of apparatus incorporating the invention;

FIG. 14 is a schematic view of a third embodiment of the apparatus incorporating the invention; and FIG. 15 is a detail of a cutter roller suitable according to the invention for use with the embodiment of FIG. 14.

As shown in the preferred embodiment, FIGS. 1–10, the continuous cloth cutter includes a conveyor system generally designated 1, a cutting roller 2, a counter-pressure roller 3, a scrap removal system 4, a garment blank transfer system 5, a receptacle and indexing conveyor system 6.

The conveyer system 1 generally comprises an endless belt 7, and for reasons as hereinafter described, preferably of stainless steel having a hardness of 38–40 Rockwell "C," with a thickness at the center of .0322 inch, a taper to the edges to a width of .0318 inch, and for knitted cloth, a width of about 26 inches. The endless belt 7 is driven by the end drive wheels 8 and 9, with lateral alignment of the belt 7 being maintained by the flexible V-belts 10 (FIGS. 1 and 7) bonded to the inner surface of the belt 7 (FIG. 7) and cooperating with the grooves 11 and 12 in the drive wheels 8 and 9. Drive wheels 8 and 9 in turn are mounted by suitable bearing supports 13 and 14 on frame 15. Wheels 9 are driven at a constant preselected speed through motor 16 and chain drive and sprockets 18, while wheels 8 idle at the preselected speed. The diameters of the drive wheels 8 and 9 are sufficiently large to prevent stressing by bending of the stainless steel belt 7, for example 34 inches in diameter. The frame 15 in turn is supported by the vertically adjustable legs 19. Both ends of the bearing support 13 for wheels 8 are mounted on horizontally slidable L-plates 20 bolted to the frame 15 by suitable bolts through horizontal slots in the L-plates 20. The L-plates 20 are adjustably positioned horizontally by the screw adjustments 21 acting against the vertical surface of the L-plates 20, thereby enabling proper adjustment of the wheels 8 for proper tensioning of the conveyor belt 7. The outer surface of the belt 7 may be roughened by sandblasting in order to ensure a good lay of the cloth.

Intermediate the drive wheels 8 and 9 is the cutting system including the cutter roller 2, the pressure roller 3 and the scrap removal system 4.

In the preferred form for this assembly, the pressure roller 3 is mounted for rotation by an integral shaft 22 in turn carried by the bearing housings 23. The bearing housings 23 are fixed to the frame 15 as shown in FIG. 8. Rotation of the pressure roller 3 is accomplished by the chain and sprocket drive 24 as shown with a peripheral speed equal to the linear speed of the belt 7, as driven by the drive wheels 9.

The pressure roller 3 comprises a drum 25 having its outer ends 26 at a greater diameter, with the center transverse portion carrying the belt 7 recessed no more than and preferably slightly less (.006 inch) than the thickness of the belt 7 at its center. Provision of V-grooves 27 is also made for reception of the V-belts 10.

The cutter roller 2 generally comprises a drum 28 having a hollow central portion 29 and radial openings 30 extending from the central portion 29 to a portion of the periphery 31 of the drum. Circular end plates 32, 33 of larger diameter are bolted onto the drum 28, or threaded thereon by utilizing the central portion 29. End plates 32, 33 include outwardly extending stub shafts 34, 35 integral therewith. One of the end plates 32 and its corresponding stub shaft 34 include a central bore 34a communicating directly with the hollow center 29 of the drum 28.

Snugly fitting over the drum 28 and covering the peripheral drum portion 31 having the radially extending holes 30 is a sleeve member 36. The sleeve member 36 may be a single cylindrical unit having an outer circumference equal to the pattern repeating length, or may include sectional portions bolted to the periphery of the drum 28. In this manner, the sleeve 36 can be removed, and others of different patterns having the same repeating length, replaced.

The composite sleeve 36 is grooved according to the pattern to be cut, as shown in part in FIGS. 3 through 6, and each groove 37, as shown, is in the form of a 90 degree V-cut. Within each groove 37 is an elongate cutter blade 38 formed from lengths of $\frac{3}{32}$ inch square tool steel shaped according to the cross-section shown in FIG. 6 to form a 45 degree included angle at the cutter edge. The blades 38 in turn are fixed to the sleeve 36 in the grooves 37 by the heads of screws or bolts 39 spaced along the length of and adjacent the grooves 37 as shown in FIG. 6. We have determined that a 45 degree angle is optimum, in that blade life is extended, long transverse cuts in cloth are still possible, and warping and nicking is reduced.

The sleeve 36, while itself of hard, non-resilient material, may be further hardened at its surface by known metallurgical means, as shown at 36a, in order to prevent any possibility of transverse slipping of the blades 38 in their respective grooves 37.

As an example of the pattern, FIG. 12 shows a layout for the manufacture of a T shirt, wherein (a) represents the garment blank portions and (b) represents the intermediate waste portions. The pattern is cut from a double thickness web formed from a flattened tube of circular knit material. The width of the pattern and the web is shown as (d) and the length as (c). The dimension (c) is herein referred to as the repeating length; and for a maximum savings of material, the transverse cuts of two adjacent patterns can be made simultaneously by the same blade 38. Thus, the dimension (c) represents the circumference of the cutter roller 2, with an adjustment ratio of about .977 to compensate for the blade thickness.

The assembled cutter 2 is mounted between the thrust plates 40 fixed to frame 15 with the stub shafts 34, 35 extending through the open slots 41 formed within the thrust plates 40. A floating collar 42 is provided for each of the stub shafts 34, 35, which collars provide the bearing surfaces for rotation of the cutter roller 2. A pair of tension bars 43 connects each of the floating collars 42 to an additional collar 44 mounted on the shaft 22 of the pressure roller 3. The tension between the cutter roller 2 and the pressure roller 3 is adjusted by the nuts 45 threaded on the tension bars 43 as shown.

From FIGS. 4 and 8, it can be seen that the rims of end plates 32, 33 of the cutter roll frictionally engage the rims of the end portions 26 of the pressure roller 3, with the belt 7 passing the recessed bite therebetween. The thrust plates 40, or included thrust collars between the plates and the cutter roller (not shown), provide for positive transverse alignment of the roller to prevent transverse motion during operation of the apparatus. Where thrust collars are provided, such thrust collars can be positively adjustable for various longitudinal and vertical positions in a known manner to ensure positive transverse alignment.

The cutter roller 2 is rotated at a peripheral speed equal to that of the pressure roller 3 by the friction drive between the circular end plates 32, 33 and the end portions 26 of the pressure roller 3. Thus, it can be seen that, for patterns of different repeating length, the entire cutter roller 2 can be removed and others of different diameter replaced in the open slots 41 and collars 42. Moreover, the driving arrangement is not disturbed, or need not be altered, since the frictional drive ensures an equal peripheral speed for the cutter roller 2, independent of its diameter.

A vacuum hose 46 is attached to the stub shaft 34 and end plate 32 having the central bore 34a, and a suitable vacuum source (not shown) is provided for communication through the hose 46 and end plate 32 to the center of the drum 28. Corresponding holes 47 are provided in the sleeve 36 only at the areas of the waste portions of the material intermediate the garment blanks, which holes are in alignment with corresponding radial holes 30 of the drum 28. The remaining radial holes 30 are blocked off by the sleeve 36, such that only the waste portions of the cut web of cloth will attach themselves by the vacuum to the cutter roller 2 for rotation therewith.

The scrap removal system 4, partially shown here, includes a nozzle shaped opening 48, extending in the direction of the attracted scrap on the cutter roller 2 as it approaches the nozzle 48 and across the width of the cutter roller 2, and suitable duct work 49 connecting the nozzle 48 to a high velocity vacuum system (not shown). The vacuum system provides sufficient velocity through the nozzle 48 for removal of the scrap held by the lesser vacuum of the cutter roller 2. In order to ensure a proper flow of air, there is provided a two inch head portion, with the opening spaced $\frac{3}{8}''$ from the periphery of the cutter roller 2. A trailing portion 50 of rigid material spaced $\frac{1}{16}''$ from the periphery or of flexible material riding the periphery is also provided. The material scraps may then be conveyed through the connecting duct work to a scrap container (not shown). The positioning of the nozzle 48 can be accomplished by the use of known flexible ducting and positive-positioning friction linkages.

At the delivery end of the conveyor 7 after cutting of the blanks is the transfer system 5. The transfer system 5 comprises a pair of end rolls 51 mounted for rotation on end supports 52 fixed to the frame 15. Passing around the rolls 51 are a plurality of transversely spaced narrow, endless belts 53; and driving of the belts 53 is accomplished by a drive belt 54 mounted as shown, or in any similar manner, such that the direction of movement of the belts 53 at their lower positions is the same as the direction of movement of the stainless steel belt 7. Preferably, the driving means is fixed such that the linear speed of the narrow belts 53 is slightly greater than the linear speed of the stainless steel belt 7.

In the area between the rolls 51 and the narrow belts 53 is a sheet metal hood 55, which hood is open at the bottom and has a hose 56 connecting it to a suitable vacuum source (not shown). Thus, as vacuum is supplied to the hood 55 through the vacuum source, any cut garment blanks on the stainless steel belt 7 will attach themselves to the narrow belts 53 through the vacuum as air passes between the spaced belts. By having the narrow belts 53 at a slightly greater linear speed, the tendency of the blanks to wrinkle as they transfer can be eliminated. Obviously a single perforated belt can be used, but spaced narrow belts have the advantages of inexpensive replacement and easier alignment.

Within the hood 55 are a plurality of flapper valves 57 extending along the entire transverse width of the hood 55, which valves divide the hood 55 into a receiving portion 58 and a depositing portion 59. When closed the valves 57 will cut off the vacuum within the depositing position and any blanks at that portion will fall by gravity. These flapper valves 57 are made of slightly flexible material to ensure a tight closure. The valves 57 are pivoted about their respective shafts 60, and are positioned by means of the pinion gears 61 and common rack 62 as shown in FIG. 10. The rack 62 is fixed to the armature 63 of an electro-magnetic solenoid 64, which when activated, draws the armature 63 downwardly against the bias of the spring 65 shown. This motion closes the flapper valves 57, while on deactivation, the force of the spring 65 urges the armature 63 upwardly again to pivot the flapper valves 57 to the open position.

While any suitable detector means may be provided, as shown here, a photoelectric detector 66 from within the hood 55 is directed toward a space between the belts 53 to detect the presence of any material being carried by the belts. Upon detection and suitable amplification as schematically shown at 67 in FIG. 10, the solenoid 64 is activated to close the flapper valves 57 and cut off the vacuum at the depositing portion 59 of the hood. The cut blank is thereby released and may fall by gravity into the receptacle 68.

In order to prevent wrinkling of the blanks as they fall from the transfer system 5, the receptacle 68 may be provided with a platform 69 mounted on weak springs 70 as shown. Thus, the height of the platform 69 is determined by the weight of blanks already received thereon, and subsequent blanks need fall only a short distance.

The receptacle 69 itself is supported on the roller system 71 and may be moved out of position by hand and another receptacle substituted, or such removal be accomplished by means of a known indexing means when the receptacle receives the appropriate number of blanks. Such indexing may be accomplished by a counting of the number of times of operation of the photo-electric control system or by a weight measurement on the rollers 71. In this manner, transfer of the receptacle 68 may be accomplished by using positive driving rollers during operation of the indexing system.

In the operation of the apparatus as described in the preferred embodiment, a web of cloth 72, suitably knit material of the gauge used for T-shirts, undershirts, etc. (.032 inch thick) is rolled or stacked in accordion layers at the receiving end 73 of the apparatus. This portion of the belt may vary in length depending on the necessary inspection or pre-cutting station. The forward end of the cloth 72 is aligned at some suitable marking on the belt 7 for proper cutting and the machine motor drive is turned on. The stainless steel belt 7 delivers the web of cloth 72 to the cutter roller 2, and after cutting the selected cut blanks for the finished garment proceed on the belt 7, while the intermediate scrap material is held to the cutter roller 2 for subsequent transport to the scrap removal system 4. As the cut blanks approach the transfer conveyor belts 53, the vacuum applied to the transfer system 5 lifts the cut blanks from the stainless steel belt 7 and holds them against the transfer conveyor belts 53. Thereafter, as each cut blank approaches the detector system, the electro-magnetic solenoid 64 operates to close the flapper valves 57 and cut off the vacuum at the deposition portion 59 above the receptacle 68, at which time the blank is dropped into the receptacle.

Thus it can be seen that cutting may now be done continuously with a single operator for one of a group of such machines. For changes in the patterns to be cut, only the cutter roller 2 need be removed, and according to the disclosed embodiment, the driving means need not be disturbed. For patterns utilizing the same diameter of cutter roll, replacement sleeves 36 may also be considered. Moreover, new cutting blades 38 may be inserted at only a moderate expense.

While stainless steel has been described with respect to the belt 7, some materials other than stainless steel may be used, provided they have substantially the same properties. For example, nylon, cellulose acetate, tin, aluminum and galvanized iron were all used, but such were not suitable. It is important that the material be non-resilient, very hard, and non-oxidizing or in any way not contaminative of the cloth. Both the cutter roller 2 and pressure roller 3 are to be of non-resilient hard material and positively positioned in a non-resilient manner.

The cutter roller 2 in the embodiment shown for cutting of T shirts has a diameter of about 11 inches and weighs approximately 300 pounds. The retaining tension bars 43 are of one inch diameter cold rolled steel and are tightened by the nuts 45 at more than hand-pressure. Thus, the weight of the roller 2 with the negative tolerance described, limited in change of position by the elasticity of the cold rolled steel bars, is sufficient to cut the knitted cloth. However, it is important to note that such positive direct tension through rigidity is necessary with respect to the cutting of closely knit material, and known springs do not provide sufficient force. As an alternative, we have successfully used one or more pressure rolls rotatably mounted in housings on an axis parallel to the cutter roller and acting on the end plates of the cutter roller 2 in axial opposition to and in a manner similar to the action of the pressure roller 3. In this form, the tension bars connect the housings to the collars 44 of the pressure roller 3. A further alternative would be the use of hydraulic or combination hydraulic-pneumatic pressure application means at the roller extremities.

For most knitted cloth, a plane surface on the stainless steel belt 7 may be sufficient. However, the roughened surface by sandblasting can be considered in order to maintain a proper alignment of the web of cloth on the belt.

In the embodiment of the cutter blade shown in FIG. 11, the one surface 74 of the blade 38a facing the intermediate waste portions is made concave with the same included angle of 45 degrees; and by such, the waste portions may be held on the cutter roller 2 by the surfaces 74 around the periphery of each waste portion, thereby eliminating or at least substantially reducing the amount of vacuum necessary for retention of the waste portions on the cutter roller 2 for transfer to the waste removal system 4.

In an alternative embodiment of apparatus incorporating the invention, shown schematically in FIG. 13, the stainless conveyor belt is eliminated, and the blank transfer system is further utilized as a cloth web delivery means.

The transfer system 5a, including the spaced narrow belts 53a, hood 55a and associated vacuum and detector systems, and the receptacle and indexing conveyor system 6a are all of the same construction as shown in the preferred embodiment. Similarly, the pressure roller 3a and cutter roller 2a are of the same construction and mounted in the same manner as in the preferred embodiment, except that the center transverse portion of the pressure roller is not recessed to compensate for the conveyor belt, although a similar negative tolerance is desirable.

In this embodiment, the web of cloth 75 is fed by the upper sides of the belts 53a, to the bite between the cutter roller 2a and the pressure roller 3a. As in the preferred embodiment, the vacuum from within the cutter roller 2a attracts the waste, while the blank portions are carried on to the transfer system 5a by means of an endless flexible web belt 76 passing around rollers 77 and driven at a linear speed equal to the peripheral speed of pressure roller 3a and the linear speed of the belts 53a. The belt 76, by pressing against the roller 3a, retains the blanks against the surface of the roller 3a until the blanks adopt a horizontal attitude. To ensure that the blanks do not continue on around the pressure roller 3a, there is provided a peeler bar 78, which peeler rides against the surface of the pressure roller 3a, in a manner similar to a calendering mechanism for web-forming machines.

The waste is removed from the cutter roller 2a by a waste hood 79 connected through suitable ducting 80 to a high velocity vacuum source 81.

In a further embodiment incorporating the invention, as shown schematically in FIGS. 14 and 15, the stainless steel conveyor belt is again dispensed with, and an air pressure system rather than vacuum is utilized within the cutter roller.

As before, the transfer system 5b, including the belts 53b, hood 55b, the associated vacuum and detector system, and the receptacle and indexing conveyor system 6b are all of the same construction as shown in the preferred embodiment. The pressure roller 3b is of the same construction as the pressure roller of the preferred embodiment, except that the center transverse portion, as in the embodiment of FIG. 13, is not recessed for compensation of the conveyor belt.

In this further embodiment, the web of cloth 82 is first fed around the pressure roller 3b, as shown, to the bite between the pressure roller 3b and the cutter roller 2b, where the cutting is accomplished. Behind each transverse cutting blade 38b forming the beginning of a blank portion, there is associated a transverse row of pins 87 attached to a block 88 slidable within a keyed slot 89 formed at the periphery of the cutter roller 2b. As the pins 87 approach the bite between the pressure roller and cutter roller, they drop by force of gravity and are exposed sufficiently to grab the leading edge of the web of cloth 82, as formed by the associated cutter blade 38b. Then, on further rotation of the rollers, the leading edge of the web is carried on around the cutter roller 2b to enable the subsequent cuts for completing another blank portion. As the pins 87 approach the peak of revolution of the cutter roller 2b, they drop to within the slot 89 by gravity to release the associated blank portion. At this point, the blank portions are peeled off by a peeler bar 83 and attracted to the belts 53b of the transfer system 5b. In lieu of the gravity means, the pins 87 may be urged outwardly by suitable spring means within the slot 89, and may be cammed inwardly by a suitable stationary eccentric circle cam at the ends of the cutter roller, with the block 88 functioning as a cam follower.

Waste removal is accomplished by the utilization of another high velocity vacuum source 84, a waste collection hood 85, and associated ducting 86. Instead of the vacuum system within the interior of the cutter blade 2b, as described in the preferred embodiment, an air pressure system is used, sufficient air being provided to blow off the waste from the periphery of the cutter roller at the waste portions thereof and into the waste collection hood 85. In all other respects, the construction according to the embodiment shown in FIGS. 14 and 15 is like that of the preferred embodiment.

It is of course obvious that yet other details of construction can be resorted to without departing from the spirit of our invention or the scope of the subjoined claims.

We claim:
1. For a continuous cloth cutter, a rotary die cutter comprising: a drum defining a hollow center and a plurality of holes extending radially from the hollow center to the periphery of the drum; a pair of end plates, each enclosing an end of the hollow center of the drum; fluid port means extending through one of the end plates to the hollow center of the drum for communication therewith; a removable sleeve enclosing the periphery of the drum and including a pattern of grooves according to a selected pattern; cutter blades each defining an anchoring portion fitting in the grooves and including faces on each side of the blade edge; and screws threaded into the sleeve and including heads retaining the cutter blades in the grooves through the said faces so as to secure the cutter blades to the outer surface of the sleeve in a selected pattern forming separate blank sections and intermediate waste sections, the sleeve defining fluid flow openings connecting a part of the holes in the drum to only the part of the outer surface of the sleeve between the cutter blades forming the waste portions, the remaining holes of the drum being blocked by the sleeve.

2. A rotary die cutter according to claim 1 and further comprising vacuum means connected to the fluid port means for holding waste portions of cloth to the outer surface of the sleeve at the waste sections of the sleeve through the said fluid flow openings.

3. A rotary die cutter according to claim 1 and further comprising air pressure means communicating with the fluid port means for blowing off waste pieces of cloth at the waste portions of the sleeve through the said fluid flow openings.

4. A rotary die cutter according to claim 3 and further comprising a plurality of pins exposed at the outer surface of the sleeve at the blank sections thereof to retain blanks of cut cloth on the surface of the sleeve, and means for retracting the pins to within the sleeve for removal of the said blanks.

References Cited by the Examiner

UNITED STATES PATENTS

| | | | |
|---|---|---|---|
| 705,041 | 7/1902 | Copland | 83—100 |
| 1,577,620 | 3/1926 | Gammeter | 83—98 |
| 1,797,448 | 3/1931 | Sheldon | 83—346 X |
| 2,302,855 | 11/1942 | Hallman | 83—100 X |
| 2,445,831 | 7/1948 | Hoffman et al. | 83—100 |
| 2,523,153 | 9/1950 | Shapiro | 83—98 |
| 2,887,964 | 5/1959 | Griner | 83—100 |
| 3,106,121 | 10/1963 | Novick | 83—100 X |
| 3,117,499 | 1/1964 | Golding | 83—100 X |

WILLIAM W. DYER, JR., *Primary Examiner.*

J. M. MEISTER, *Assistant Examiner.*